(12) United States Patent
Boutaghou et al.

(10) Patent No.: US 6,499,881 B2
(45) Date of Patent: *Dec. 31, 2002

(54) HYDRODYNAMIC BEARINGS AND BOUNDARY LUBRICATED SYSTEM WITH DLC BUMPS

(76) Inventors: Zine Eddine Boutaghou, 307 Lily Pond La., Vadnais Heights, MN (US) 55127; Peter R. Segar, 13840 Sunset Lake Dr., Burnsville, MN (US) 55337

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,761

(22) Filed: Oct. 7, 1999

(65) Prior Publication Data

US 2002/0057855 A1 May 16, 2002

Related U.S. Application Data

(60) Provisional application No. 60/115,957, filed on Jan. 15, 1999.

(51) Int. Cl.[7] ................................................ F16C 32/06
(52) U.S. Cl. ....................................................... 384/107
(58) Field of Search ................................. 384/100, 107, 384/114, 276, 282, 283, 284, 907.1

(56) References Cited

U.S. PATENT DOCUMENTS

| | | | | |
|---|---|---|---|---|
| 4,764,036 A | * | 8/1988 | McPherson | ................. 384/276 |
| 4,866,886 A | * | 9/1989 | Holmstrand | ................. 51/307 |
| 5,037,212 A | * | 8/1991 | Justman et al. | ......... 384/107 X |
| 5,092,687 A | * | 3/1992 | Hall | ..................... 384/907.1 X |
| 5,366,298 A | * | 11/1994 | Toshimitsu et al. | ......... 384/107 |
| 5,531,631 A | * | 7/1996 | Judge | ............................ 451/5 |
| 5,688,053 A | * | 11/1997 | Itoh et al. | .................... 384/100 |
| 5,743,655 A | * | 4/1998 | Slavin et al. | ............... 384/107 |
| 5,806,987 A | * | 9/1998 | Nose et al. | ............. 384/107 X |
| 5,829,861 A | * | 11/1998 | Furlani et al. | ....... 384/907.1 X |
| 5,840,070 A | * | 11/1998 | Wampler | .................... 604/131 |
| 5,988,886 A | * | 11/1999 | Takahashi | .................... 384/107 |
| 6,056,441 A | * | 5/2000 | Scharrer et al. | ........ 384/100 X |
| 6,126,320 A | * | 10/2000 | Ichiyama | ................ 384/107 X |
| 6,157,515 A | * | 12/2000 | Boutaghou | ............. 384/100 X |
| 6,212,042 B1 | * | 4/2001 | Gui et al. | ................ 360/236.6 |

* cited by examiner

*Primary Examiner*—Charles A Marmor
*Assistant Examiner*—Roger Pang (57) ABSTRACT

A system for keeping the imperfectly machined surfaces of bearings apart at rest. The system includes a first bearing surface which moves facing a second bearing surface, the first surface having a distribution of discrete diamond-like carbon (DLC) pads deposited upon an adhesion layer. The DLC pads are at a height which is approximately the height of the roughness or imperfections of the surfaces. The pads are distributed over the surface at approximately three pads to forty pads or more per square inch. The pads keep the bearing surfaces from coming in contact. Also disclosed is a hydrodynamic bearing having a thrust plate having hydrodynamic grooves and DLC pads on a thrust surface, and a rotor member having an end facing the thrust plate, and a ball and socket bearing having DLC pads deposited on either the socket surface or ball surface.

20 Claims, 8 Drawing Sheets

HYDRODYNAMIC BEARINGS AND BOUNDARY LUBRICATED SYSTEM WITH DLC BUMPS

RELATED APPLICATION

This application claims the benefit of U.S. Provisional Application Serial No. 60/115957, filed Jan. 15, 1999 under 35 U.S.C. 119(e).

FIELD OF INVENTION

The present invention relates to the field of mass storage devices. More particularly, this invention relates to improving the tribological performance of bearings in a disc drive.

BACKGROUND

One of the key components of any computer system is a place to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically housed within a small ceramic block. The small ceramic block, also referred to as a slider, passes over the disc in a transducing relationship with the disc. The transducer can be used to read information representing data from the disc or write information representing data to the disc. When the disc is operating the disc is usually spinning at relatively high revolutions per minute (RPM). These days common rotational speeds are up to 10,000 RPM. Higher rotational speeds are contemplated for the future. The small ceramic block, or slider, is usually aerodynamically designed so that it flies over the disc. The best performance of the disc drive results when the ceramic bock is flown as closely to the surface of the disc as possible. Today's small ceramic block or slider is designed to fly on a very thin layer of gas or air. In operation, the distance between the slider and the disc is very small. The fly height is the thickness of the air lubrication film or the distance between the disc surface and the transducing head. Currently, fly heights are about 0.5–1.0 micro inches. In some disc drives, the slider passes through a layer of lubricant rather than flying over the surface of the disc.

Information representative of data is stored on the surface of the memory disc. Disc drive systems read and write information stored on tracks on memory discs. Transducers, in the form of read/write heads attached to the sliders, located on both sides of the memory disc, read and write information on the memory discs when the transducers are accurately positioned over one of the designated tracks on the surface of the memory disc. The transducer is also said to be moved to a target track. As the memory disc spins and the read/write head is accurately positioned above a target track, the read/write head can store data onto a track by writing information representative of data onto the memory disc. Similarly, reading data on a memory disc is accomplished by positioning the read/write head above a target track and reading the stored material on the memory disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

The memory disc rotates upon a spindle. The spindle assembly contains bearings such as hydrodynamic bearings or ball and socket bearings. Bearings are generally used in numerous applications to allow two surfaces to be supported, guided, or rotated in relation to each other. Hydrodynamic bearings are bearings in which a fluid barrier, such as a lubricant or air, is created between the stator or stationary bearing surface and the rotor or dynamic bearing surface which faces the stator surface. One problem encountered using hydrodynamic bearings is that, during start up of the bearing, before the fluid barrier is formed, machined imperfections on the two facing bearing surfaces, such as machining burrs and imperfect flatness, come into contact with each other. This localized pressure causes a jerky and unpredictable rotation. Also, when the bearing slows down and the two surfaces come into contact again, the burrs can cause unpredictable behavior and may also cause further damage to the other surface.

Ball and socket bearings are bearings in which a ball rotates within a socket and a boundary lubricated interface is developed between the two surfaces. Ball and socket bearings are used in many devices beyond disc drives such as in diverse machinery, automobiles, and knee replacement joints. One problem encountered using ball and socket bearings is that, before the lubricant boundary is formed, the machined imperfections on the surfaces of the ball and the socket strike each other during a period called break-in. The broken material then causes Lewis acids to form, which cause a break down of the lubricant itself. Another problem with bearings in general is that when the stator surface and the rotor surface are made out of different materials, the tribological performance is unpredictable.

A general solution to these problems is to reduce the machined imperfections on the bearing surfaces. However, it is not technologically feasible to machine surfaces that are theoretically perfect and without defects. At a microscopic level, protuberances and imperfections are always present and inherent in the materials. Also, from an economic perspective, it is expensive to attempt to machine surfaces with such minuscule tolerance for error. Furthermore, even if two surfaces were theoretically flat, the problem of inherent static friction at start up would still be a problem since the surfaces would be in complete contact with each other, and this real surface contact would lead to a high localized pressure throughout the contacting surfaces. Thus, a flat surface itself can lead to unpredictable performance.

Thus, what is needed is an economically feasible system that permits the smooth and predictable takeoff and landing of hydrodynamic bearing surfaces, avoids the break-in period of ball and socket bearings, and permits bearing designers to use dissimilar bearing materials while achieving predictable performance.

SUMMARY

The present invention provides a system for minimizing contact between the surfaces of bearings at rest. Thus, there is a smooth and predictable take-off period and landing period for hydrodynamic bearings, and a clean break-in period for ball and socket bearings. The system includes a first bearing surface which moves against a second bearing surface, the first surface having a distribution of diamond-like carbon (DLC) pads or bumps. The DLC pads are at a height that is approximately the height of the roughness or imperfections of the surfaces. Thus, the pads help keep the bearing surfaces from coming in contact. The DLC pads are distributed over the bearing surface such that there are enough pads to provide support to the other bearing surface, yet not so many that the pads form a continuous surface and thereby undesirably effect the tribological performance of the bearing.

In further embodiments, the system provides a hydrodynamic bearing having a stator member having hydrodynamic grooves and DLC pads on a thrust plate surface, and a rotor member having an end facing the thrust plate. In another embodiment of the system, a ball and socket bearing having DLC pads is provided.

The present system advantageously provides a system to keep hydrodynamic and other bearing surfaces from coming in contact when the rotor bearing surface is at rest or at a slow speed. This provides the advantage that the imperfections on the surfaces will not come in contact with the other bearing surface and cause unpredictable performance or hinder development of the hydrodynamic boundary.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
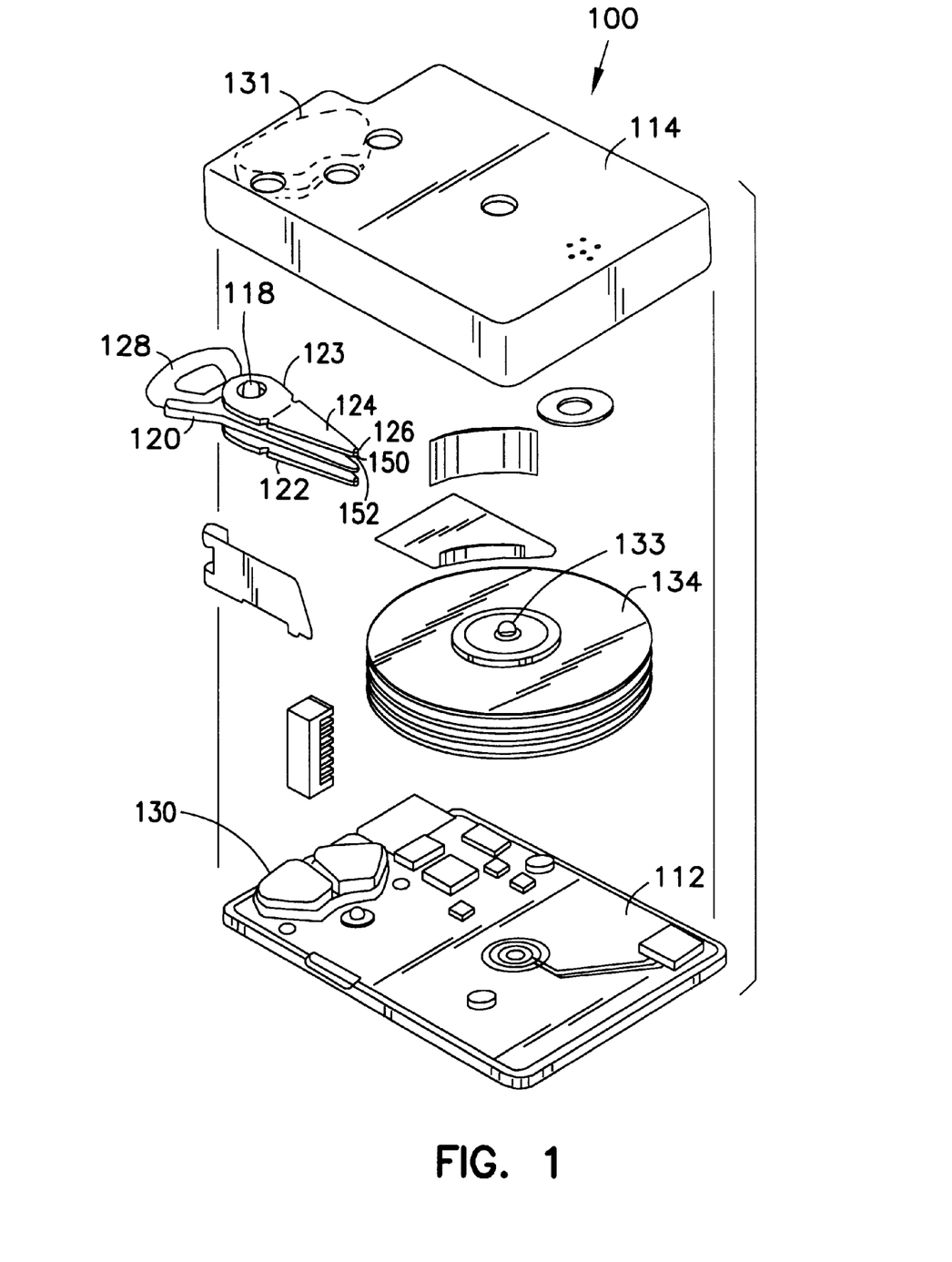
FIG. 1 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful in all types of disc drives including hard disc drives, zip drives, floppy disc drives and any other type of drives where increasing the predictability of bearing performance and disc performance may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 12:
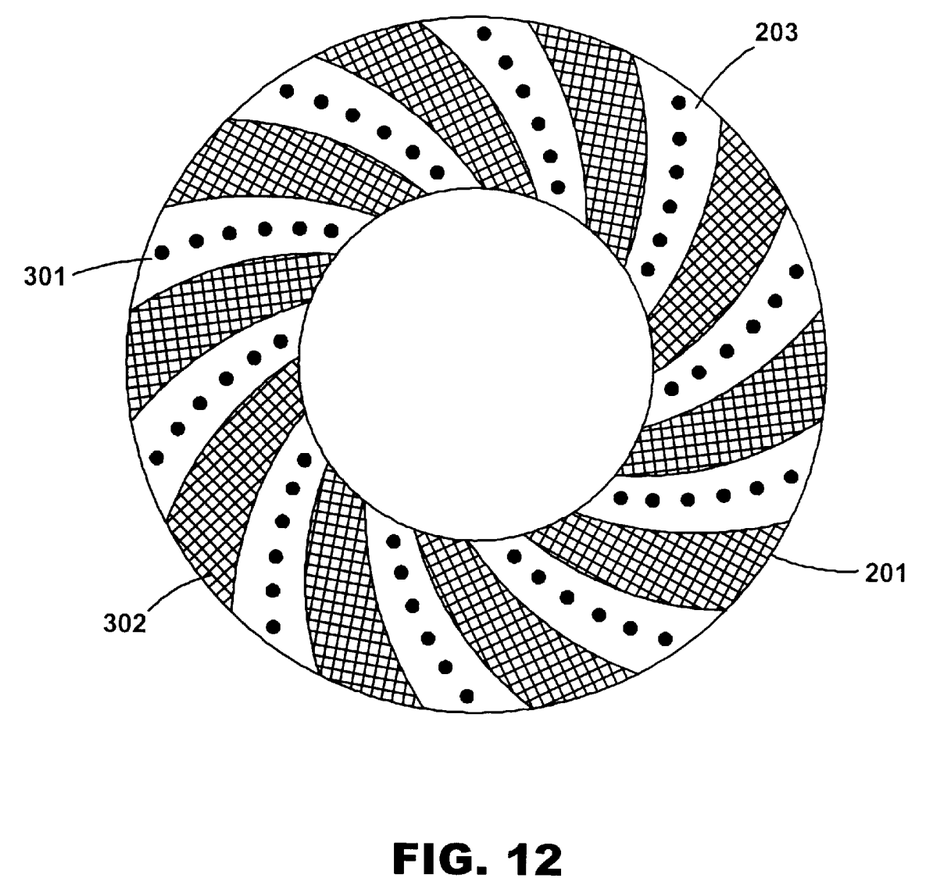
FIG. 12 is top view of a spiral bearing surface according to FIG. 2.

FIGS. 2–5 and 12 show a view of an exemplary hydrodynamic bearing assembly 200 in which one embodiment of the present system is used. Bearing assembly 200 is within a spindle motor, which can be within or under spindle hub 133. Bearing assembly 200 includes a pair of relatively moving members such as a rotor member 205 and a stator member 201. It is to be noted that the terms rotor and stator are terms relating to the relative motion of the members of bearing assembly 200 and that they are used for descriptive purposes and not as limiting terms. Stator member 201 is attached to a shaft 202. Stator member 201 includes an outer radial bearing surface 208, a first thrust plate 210, and a second thrust plate 211. Thrust plates 210 and 211 have thrust bearing surfaces 204 and 203, respectively. Thrust bearing surfaces 203 and 204 have a grooved pattern such as the herringbone groove pattern 302 shown in FIG. 3. Alternatively, the grooved pattern (as shown in FIG. 12) can be a spiral pattern or any other pattern permitting a hydrodynamic barrier to form. It is also noted that bearings designed to rotate at relatively low speeds (<2,500 RPM) generally do not have a grooved pattern. The grooved pattern upon thrust bearing surfaces 203 and 204 creates a hydrodynamic pressure when rotor member 205 rotates around stator member 201 and shaft 202. Rotor member 205 is coupled with rotor magnets 212, which confront stator coil 213. When electricity is provided to stator coil 213, rotor 205 is caused to rotate. Rotor 205 then provides rotational power to computer disc 134. Alternatively, the bearing can be used in other mechanical devices, such as a VCR head assembly or a laser scanner motor, for example.

Figure 2:
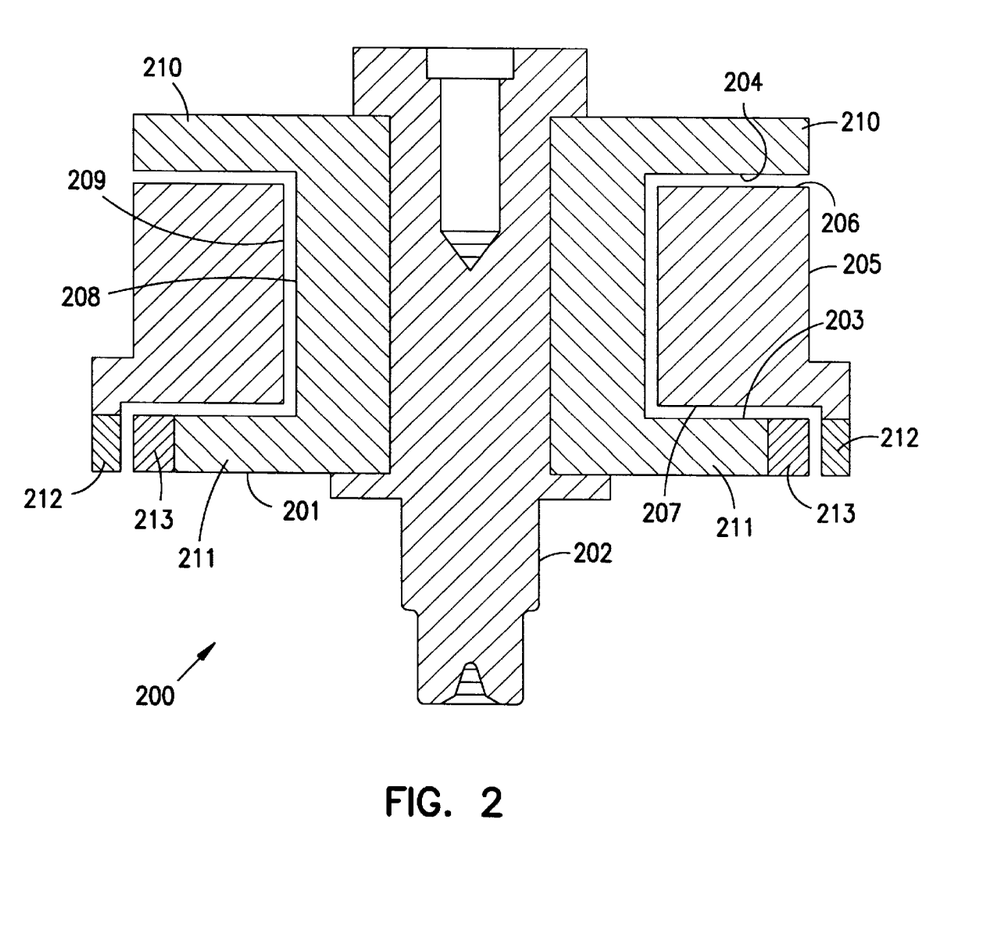
FIG. 2 is a cross-section view of an exemplary hydrodynamic bearing assembly in which one embodiment of the present system is used.

Rotor member 205 includes a top surface 206 facing thrust bearing surface 204 and a bottom surface 207 facing thrust bearing surface 203. Rotor member 205 also includes an inner radial bearing surface 209 facing stator member radial bearing surface 208. Rotor member surfaces 206 and 207 are substantially perpendicular to surface 209. In one embodiment of the present system, shown in FIG. 10, stator member radial bearing surface 208 also includes a grooved pattern 1001 for generating a radial hydrodynamic pressure when rotor member radial surface 209 rotates around stator member surface 208.

Referring again to FIG. 2, when rotor member 205 rotates around stator member 201, groove pattern 302 causes a hydrodynamic layer to be formed between thrust bearing surface 203 and rotor member surface 207 and the surfaces tend to separate. When rotor member 205 slows down, rotor member surface 207 tends to move toward surface 203 until, when at rest, the two surfaces tend to come into contact. If thrust bearing surface 204 or radial bearing surface 208 also contain hydrodynamic grooves, then a hydrodynamic boundary is formed between those surfaces and their opposing surfaces also. Those skilled in the art will recognize that different variations of grooves and surfaces are possible when designing a hydrodynamic bearing.

Figure 3:
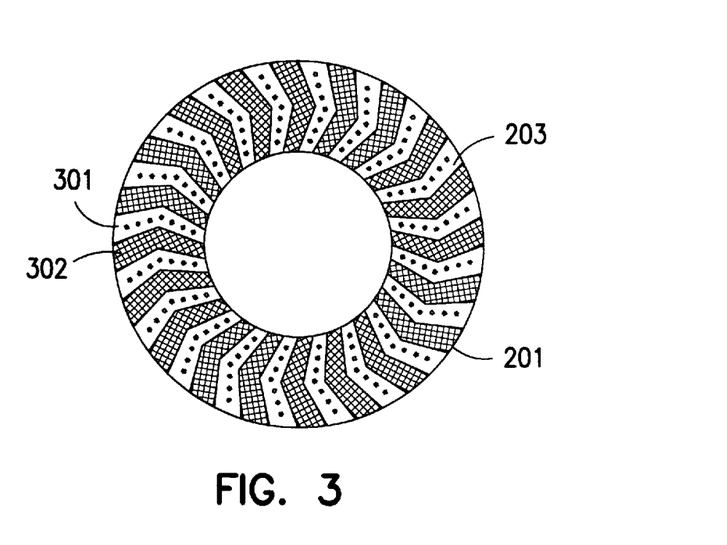
FIG. 3 is top view of a hydrodynamic bearing surface according to FIG. 2.
Figure 4:
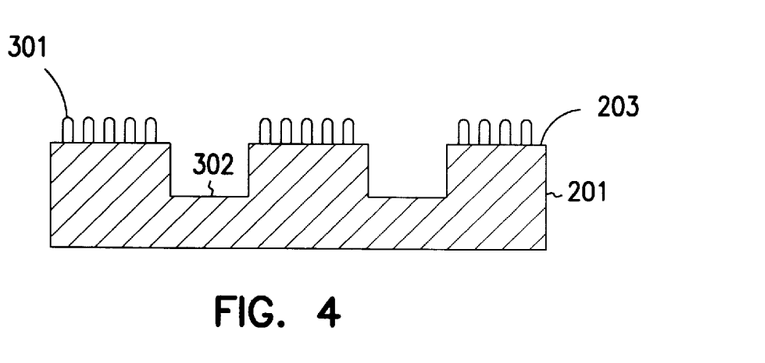
FIG. 4 is a cross-sectional enlarged side view of the hydrodynamic bearing surface according to FIG. 2.
Figure 10:
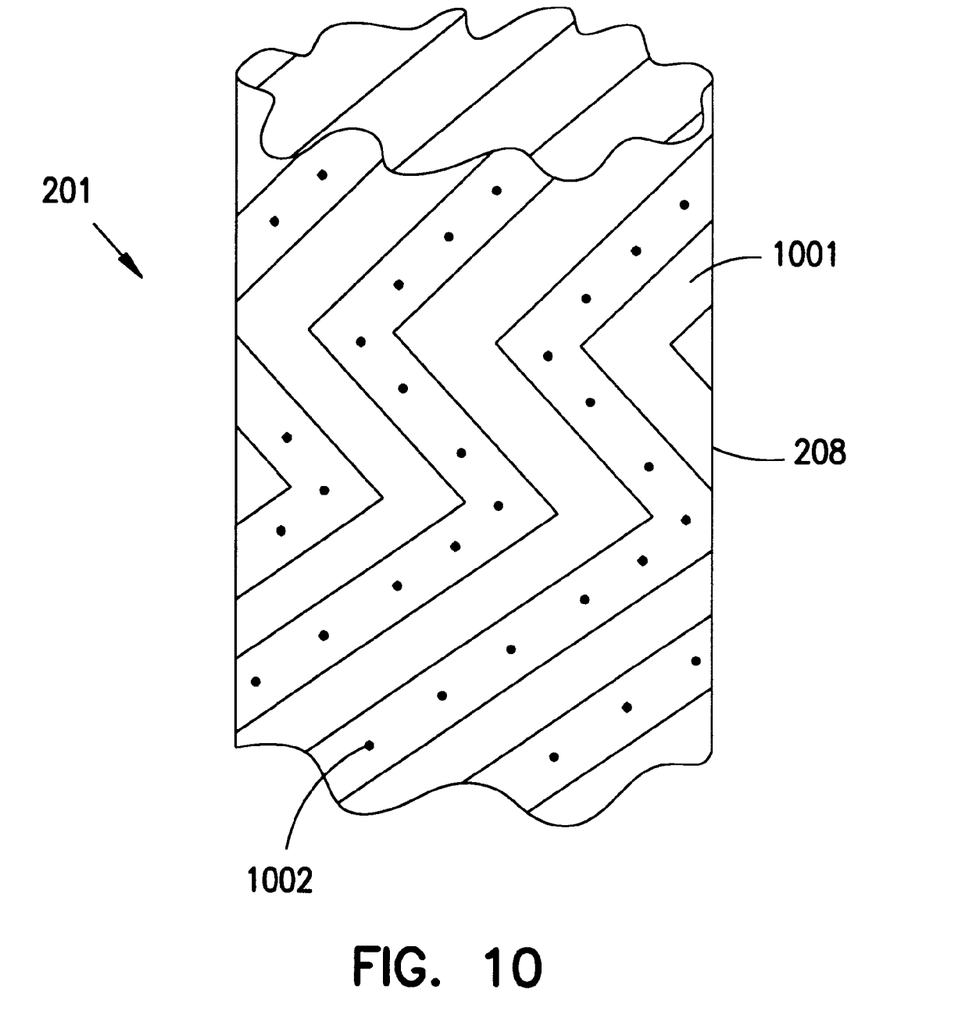
FIG. 10 is a partial view of a radial hydrodynamic bearing surface according to FIG. 2.

In this embodiment, diamond-like carbon (DLC) pads 301 are deposited on thrust bearing surface 203. In a further embodiment, DLC pads can be deposited onto thrust bearing surface 204. Furthermore, DLC pads 1002 may be deposited on radial bearing surface 208. DLC pads can also be placed on the opposing face, such as rotor member surfaces 206, 207, and 209. The present system is not limited by which surface of a bearing the DLC pads are deposited on. Those skilled art will recognize that applying the pads to different surfaces for different applications will be necessary.

Figure 5:
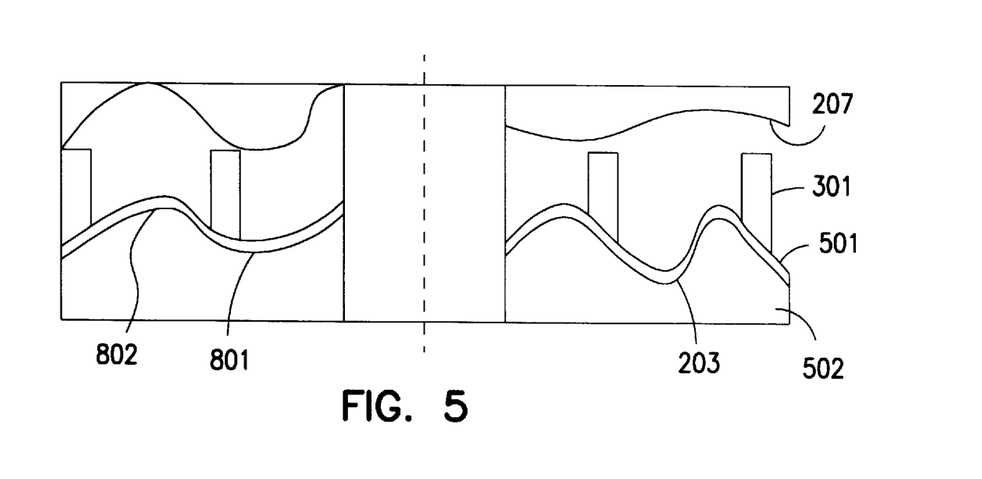
FIG. 5 is an enlarged side view of a hydrodynamic bearing surface according to one embodiment of the present system.

One exemplary process to apply DLC pads 301 to a bearing surface is as follows. An adhesion layer 501 is first deposited upon a substrate 502 of thrust bearing surface 203 to a thickness in the range of a few nanometers. Adhesion layer 501 is a material such as silicon, silicon nitrite, or silicon oxide. Methods of depositing a silicon, silicon nitrite, or silicon oxide layer on top of a substrate by chemical vapor deposition (CVD), sputtering, or RF plasma deposition are known in the art. The plurality of discrete DLC pads 301 are then deposited upon adhesion layer 501 by a method such as sputtering, CVD, or RF plasma deposition. It is contemplated that sputtering is a desirable method because it is performed at a relatively low temperature (<150 Celsius), and it is the most efficient and economical.

Figure 8:
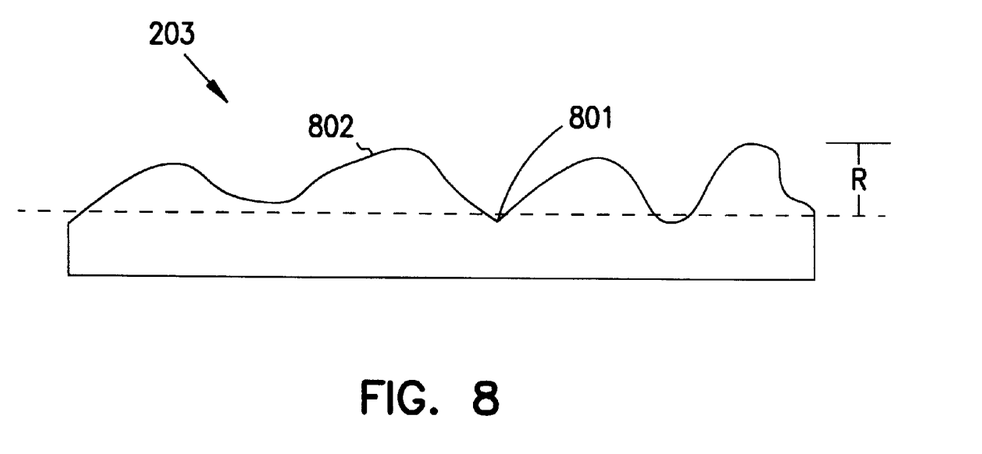
FIG. 8 is an enlarged view of a bearing surface.

Thrust bearing surface 203 is a machined surface and prone to machined imperfections, such as a protuberance or burr 802 and a depression or cavity 801, as shown in FIG. 8, which is enlarged to many times its actual size. The average roughness of surface 203 is a measurable quantity. In this embodiment of the system, the average roughness will be denoted as R. R is dependent on the method use to manufacture and machine surface 203. In this embodiment, it is approximately 1 $\mu$m. Alternatively, the roughness factor can range from 0.3 $\mu$m to 3.0 $\mu$m or higher.

In the present embodiment, DLC pads 301 have a height approximately equal to the surface roughness height. For example, if the average surface roughness R is 1.0 $\mu$m, then DLC pads 301 will have a height of at least 1.0 $\mu$m. Those skilled in the art will recognize that the important standard is not the absolute height of the pads, but the relative height of the pads compared to the average roughness of the surface they are deposited on. The height of the pads must be sufficient to ensure that there is positive clearance between thrust bearing surface 203 and rotor member bottom surface 207 during static or slow moving conditions. This provides that contact between the two surfaces will be kept to a minimum.

DLC pads 301 are distributed over surface 203 as a plurality of discrete pads. The total number of pads 301 and the concentration of pads 301 on the bearing surface is dependent on the geometry of the surface. In one embodiment, the pads are distributed to account for curvature of the facing bearing surfaces to guarantee that the two bearing surfaces will not contact. For example, a surface with a very high roughness will need a higher distribution of DLC pads, and a surface with a low roughness will need fewer. However, if too few pads are deposited upon the surface then the pads will not be able to support the opposing surface, and the opposing face will break down the pads that are there. On the other hand, if too many pads are deposited on the surface, the surface will functionally approach a continuous film of DLC instead of discrete pads. This in itself will undesirably affect the tribological performance of the bearing because the surface contact area will become too high.

In one embodiment, DLC pads 301 are distributed at approximately three pads per square inch to forty pads per square inch. However, higher pad concentrations than forty pads per square inch are also contemplated. It is noted that higher distributions of pads will better guarantee that the two surfaces do not contact each other.

Alternatively, DLC pads 301 can be deposited as organized rows of pads with a few pads per millimeter. In other embodiments of the present system, the pads can be randomly deposited on a surface until the desired distribution concentration is reached to avoid the bearing surfaces from contacting.

Figure 6:
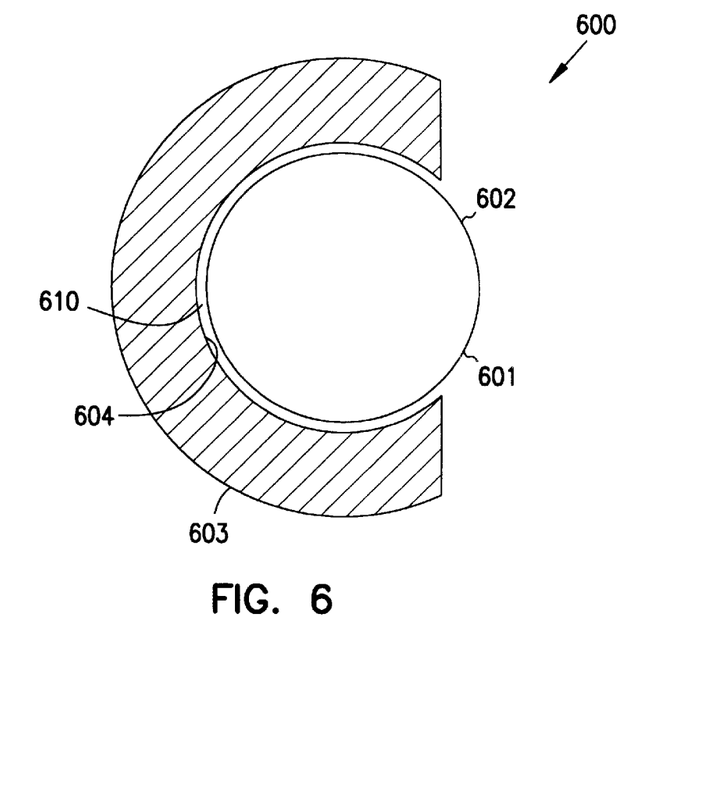
FIG. 6 is a cross-section view of a ball and socket bearing in which one embodiment of the present system is used.
Figure 7:
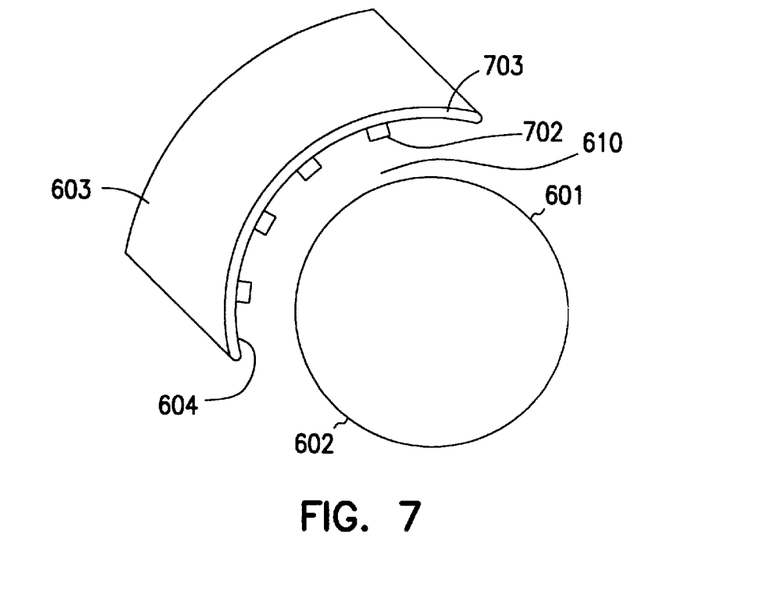
FIG. 7 is an enlarged view of FIG. 6.
Figure 9:
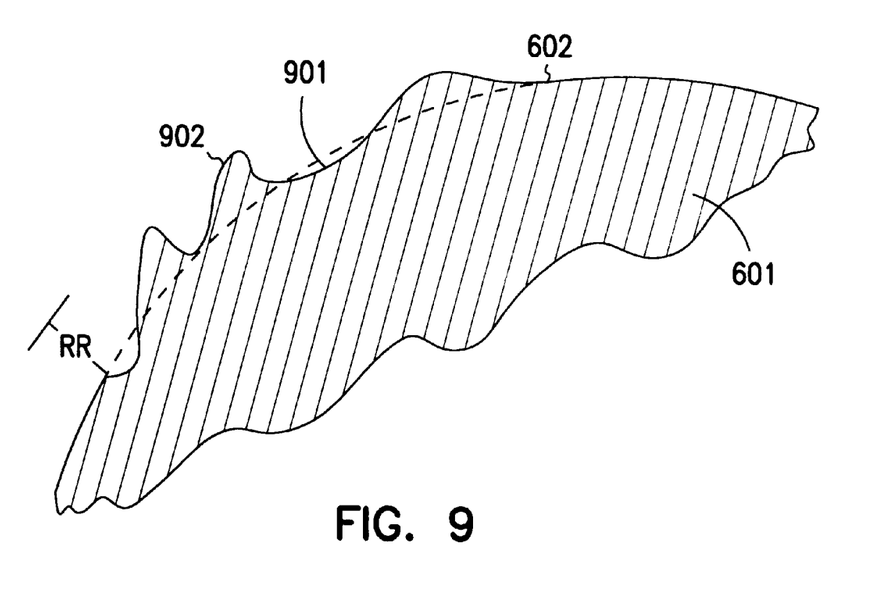
FIG. 9 is an enlarged view of a ball bearing surface.

FIGS. 6 and 7 show a view of a ball and socket bearing assembly 600 in which another embodiment of the present system is used. Assembly 600 includes a ball member 601. Ball member 601 is made from a machined or manufactured material, such as aluminum, steel, or ceramic. Ball member 601 has an outer surface 602. Surface 602 is generally smooth. However, it contains machined imperfections as shown in FIG. 9. FIG. 9 shows a section view of an enlarged region of ball member 601. Surface 602 of ball member 601 contains a plurality of imperfections such as depression or cavity 901 and protuberance or burr 902. The average roughness of surface 602 is a measurable quantity. In this embodiment of the system, the average roughness will be denoted as RR. RR is dependent on the method use to manufacture and machine surface 602. In this embodiment, it is approximately 1 $\mu$m. Alternatively, the roughness factor can range from 0.3 $\mu$m to 3.0 $\mu$m or higher.

Ball member 601 is designed to rotate within a socket member 603. Socket member 603 has an inner surface 604. Inner surface 604 faces surface 602 of ball member 601 when ball member 601 is placed within socket member 603. Inner surface 604 also has an average surface roughness which is comparable to the ball member average surface roughness RR described above and shown in FIG. 9.

When ball member 601 is rotated within socket member 603, a lubricated boundary section 610 develops. When ball member 601 is static or moving slowly, the lubricated boundary section 610 does not develop and ball member surface 602 and socket member surface 604 tend to come into contact with one another.

DLC pads 702 have a height such that surface 604 and surface 602 do not contact each other during establishment of lubrication boundary 610. In one embodiment, DLC pads 702 are deposited onto socket member surface 604 at a height which is approximately the surface average roughness height RR. In this example that is 1 μm. Alternatively, DLC pads can be deposited onto ball member surface 602. Those skilled in the art will recognize that depositing DLC pads on socket surface 604 is preferable from a manufacturing point of view. On the other hand, from a tribological point of view, depositing the pads on ball member surface 602 would better distribute the wear of the assembly during the break-in period. The DLC pads advantageously minimize contact between the bearing surfaces, thus preventing bearing break-down.

DLC pads 702 are distributed over surface 604 as a plurality of discrete pads. DLC pads 702 are deposited on surface 604 by the method described above for hydrodynamic bearing surface 203. The total number of pads 702 and the concentration of pads 702 on the bearing surface is dependent on the geometry of the surface. In one embodiment, the pads are distributed to account for curvature of the facing bearing surfaces to guarantee that the two bearing surfaces will not contact. For example, a surface with a very high roughness will need a higher distribution of DLC pads, and a surface with a low roughness will need fewer. However, if too few pads are deposited upon the surface then the pads will not be able to support the opposing surface, and the opposing face will break down the pads that are there. On the other hand, if too many pads are deposited on the surface, the surface will functionally approach a continuous film of DLC instead of discrete pads. This in itself will undesirably affect the tribological performance of the bearing because the surface contact area will become too high.

In one embodiment, DLC pads 702 are distributed at approximately three pads per square inch to forty pads per square inch. However, higher pad distributions than forty pads per square inch are also contemplated. It is noted that higher distributions of pads better guarantee that the two bearing surfaces will not contact.

Alternatively, DLC pads 702 can be deposited as organized rows of pads with a few pads per millimeter. In other embodiments of the present system, the pads can be randomly deposited on a surface until the desired distribution concentration is reached to avoid the bearing surfaces from contacting.

Advantageously, ball member 601 can be a material such as ceramic and socket member 603 can be a dissimilar material such as a metallic surface. DLC pads 702 will keep the dissimilar surfaces from contacting each other. Thus the tribological performance of the system is more predictable than if the dissimilar surfaces were in contact, as will be appreciated by those skilled in the art.

Ball and socket assembly 600 can be used in a number of different environments. For example, in disc drives, or for various automobile joints or for knee replacement joints. Advantageously, DLC is a desirable material to use for knee replacement because it is neutral and does not react with the human immune system.

The present system advantageously provides a system for keeping the imperfectly machined surfaces of bearings apart at rest or at slow speeds. Thus, there is a smooth take-off period and landing period for hydrodynamic bearings, and a clean break-in period for ball and socket bearings. This provides the advantage that the imperfections on the surfaces will have minimized contact with the other surface and will not hinder the movement of the other surface or hinder development of the hydrodynamic boundary. Thus, the tribological performance of the bearing is predictable.

Figure 11:
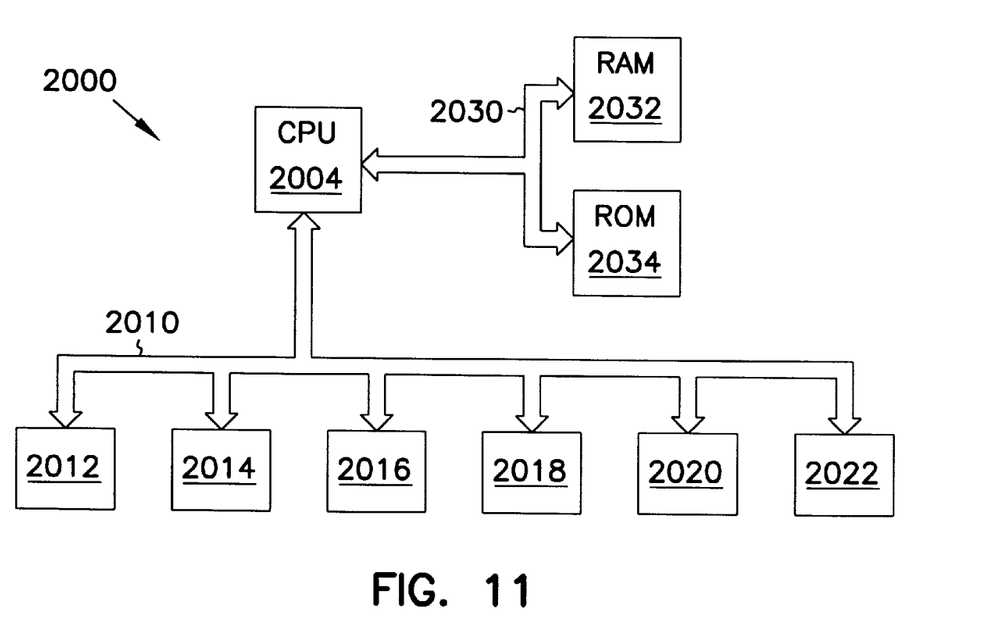
FIG. 11 is a schematic view of a computer system.

FIG. 11 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the hydrodynamic bearing described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals.

CONCLUSION

In conclusion, a system for improving bearing performance is disclosed. The bearing having a first bearing surface 203, and a second bearing surface 207 facing the first bearing surface 203. A plurality of DLC pads 301 are deposited on at least one of the surfaces, the pads 301 keeping the spacing between the two surfaces positive so that contact is minimized between the second surface 207 and the first surface 203 when the second surface 207 is at rest. The bearing surface 203 or 207 has an average roughness height, and the DLC pads 301 have a height approximately the same as the surface average roughness height, or at least as high as the surface average roughness height. In one embodiment, the plurality of DLC pads 301 are distributed on the surface 203 or 207 so that there are at least three pads per square inch on the surface. The bearing can include a socket 603 and a ball 601. If the DLC pads 702 are deposited on the ball 601 the DLC pads having a height approximately the same as the ball surface average roughness height, or at least as high as the ball surface average roughness height. In one embodiment, the plurality of DLC pads 702 are distributed so that there are at least three pads per square inch on the surface. The bearing includes an adhesion layer 703 deposited between the surface 604 and the DLC pads 702 for permitting adhesion of the DLC pads to the surface 604. If the DLC pads 702 are deposited on the socket 603, then the DLC pads having a height approximately the same as the socket surface average roughness height, or at least as high as the socket surface average roughness height.

A hydrodynamic bearing 200 is disclosed having a stator member 201 having an outer radial surface 208. The stator member 201 also having a thrust plate 211, which has a thrust surface 203 and grooves 302 on the thrust surface for generating a hydrodynamic pressure. The bearing 200 has a rotor member 205, which has an inner radial surface 209 facing the stator member outer radial surface 208 and an end surface 207 facing the thrust plate thrust surface 203. The thrust plate thrust surface 203 contains a plurality of DLC pads 301, the DLC pads 301 keeping the spacing between the thrust plate thrust surface 203 and the rotor member end surface 207 positive so that contact is minimized between the rotor member end surface and the thrust plate thrust surface when the rotor member 205 is at rest. The stator member 201 includes a second thrust plate 210, the second thrust plate 210 has a thrust surface 204 facing a second end surface 206 of the rotor member 205. The thrust plate thrust surface 203 has an average roughness height, and the DLC pads 301 have a height approximately the same as the surface 203 average roughness height, or at least as high as the surface 203 average roughness height. In one embodiment, the DLC pads 301 are distributed on the thrust plate thrust surface 203 so that there are approximately three pads per square inch to forty pads per square inch on the surface. The bearing has an adhesion layer 501 deposited between the thrust plate thrust surface 203 and the DLC pads 301 for permitting adhesion of the DLC pads 301 to the thrust plate thrust surface.

An information handling system is disclosed having a base 112, a disc 134 rotatably attached to the base 112, and a bearing 200 attached to the disc 134. The bearing 200 has a rotor surface 203 and a stator surface 207, the rotor surface 203 facing the stator surface 207. The bearing 200 includes a means for keeping the rotor surface from contacting the stator surface when the rotor surface is at rest 301.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc drive having a bearing apparatus, the bearing apparatus comprising:
   a first spindle bearing member having a surface; a second spindle bearing member having a surface, the second spindle bearing member surface facing the first spindle bearing member surface; and
   a plurality of diamond like carbon (DLC) pads deposited on at least one of the first spindle bearing member surface or the second spindle bearing member surface, the pads minimizing contact between the first spindle bearing member surface and the second spindle bearing member surface when the second spindle bearing member surface and the first spindle bearing member surface are at rest, wherein the other of the first spindle bearing member surface or the second spindle bearing member surface has an average roughness height, and the DLC pads have a height at least as high as the other of the first spindle bearing member surface or the second member spindle bearing surface average roughness height.

2. The disc drive according to claim 1, wherein the plurality of diamond like carbon (DLC) pads deposited on at least one of the first spindle bearing member surface r the second spindle bearing member surface form a pattern.

3. The disc drive according to claim 2, wherein the plurality of diamond like carbon (DLC) form a herringbone groove pattern.

4. The disc drive according to claim 2, wherein the plurality of diamond like carbon (DLC) form a spiral groove pattern.

5. A bearing apparatus, comprising:
   a first bearing member having a surface;
   a second bearing member having a surface; member surface facing the first bearing member surface; and
   a plurality of diamond like carbon (DLC) pads deposited on at least one of the first bearing member surface or the second member bearing surface, the pads keeping the spacing between the first bearing member surface and the second member bearing surface positive so that contact between the second bearing member surface and the first bearing member surface is minimized, wherein the at least one of the first bearing surface or the second bearing surface has an average roughness height, and the DLC pads have a height approximately the same as the average roughness height.

6. The bearing apparatus according to claim 2, wherein the plurality of DLC pads distributed on the at least one of the first bearing surface or the second bearing surface so that there are at least three pads per square inch on the at least one of the first bearing surface or the second bearing surface.

7. The bearing apparatus according to claim 5, wherein the plurality of diamond like carbon (DLC) pads deposited on at least one of the first spindle bearing surface or the second member spindle bearing surface form a pattern.

8. The bearing apparatus according to claim 5 wherein the plurality of diamond like carbon (DLC) pads form a herringbone groove pattern.

9. The bearing apparatus according to claim 5, wherein the plurality of diamond like carbon (DLC) pads form a spiral groove pattern.

10. A bearing apparatus, comprising:
    a first bearing member having a surface;
    a second bearing member having a surface, the second bearing member surface facing the first bearing member surface; and
    a plurality of diamond like carbon (DLC) pads deposited on at least one of the first bearing member surface or the second member bearing surface, the pads keeping the spacing between the first bearing member surface and the second member bearing surface positive so that contact between the second bearing member surface and the first bearing member surface is minimized, wherein the at least one of the first bearing surface or the second bearing surface has an average roughness height, and the DLC pads have a height at least as high as the average roughness height.

11. The bearing apparatus according to claim 10 wherein the plurality of DLC pads are distributed on the at least one of the first bearing surface or the second bearing surface so that there are at least three pads per square inch on the at least one of the first bearing surface or the second bearing surface.

12. A hydrodynamic bearing apparatus, comprising:
    a stator member having an outer radial surface, the stator member having a thrust plate at a first end of the stator member, the thrust plate having a thrust surface, the thrust plate having grooves on the thrust surface for generating a hydrodynamic pressure;
    a rotor member having an inner radial surface facing the stator member outer radial surface, the rotor member having an end surface facing the thrust plate thrust surface; and
    a plurality of diamond like carbon (DLC) pads deposited on the thrust plate thrust surface, and DLC pads keeping the spacing between the thrust plate thrust surface and the rotor member end surface positive so that contact is minimized between the rotor member end surface and the thrust plate thrust surface when the rotor member is at rest, wherein the thrust plate thrust surface has an average roughness height, and the DLC pads have a height approximately the same as the thrust plate thrust surface average roughness height.

13. A hydrodynamic bearing apparatus, comprising:

a stator member having an outer radial surface, the stator member having a thrust plate at a first end of the stator member, the thrust plate having a thrust surface, the thrust plate having grooves on the thrust surface for generating a hydrodynamic pressure;

a rotor member having an inner radial surface facing the stator member outer radial surface, the rotor member having an end surface facing the thrust plate thrust surface; and a plurality of diamond like carbon (DLC) pads deposited on the thrust plate thrust surface, and DLC pads keeping the spacing between the thrust plate thrust surface and the rotor member end surface positive so that contact is minimized between the rotor member end surface and the thrust plate thrust surface when the rotor member is at rest, wherein the thrust plate thrust surface has an average roughness height, and the DLC pads have a height at least as high as the thrust plate thrust surface average roughness height.

14. The hydrodynamic bearing apparatus according to claim 13, wherein the plurality of DLC pads are distributed on the thrust plate thrust surface so that there are at least three pads per square inch on the thrust plate thrust surface and at most forty pads per square inch on the thrust plate thrust surface.

15. The hydrodynamic bearing apparatus according to claim 13, further comprising:

an adhesion layer deposited between the thrust plate thrust surface and the DLC pads for permitting adhesion of the DLC pads to the thrust plate thrust surface.

16. The hydrodynamic bearing apparatus according to claim 13, further comprising a plurality of DLC pads deposited on the stator member outer radial surface.

17. The hydrodynamic bearing apparatus according to claim 13, wherein the plurality of diamond like carbon (DLC) pads deposited on the thrust plate thrust surface form a pattern.

18. The hydrodynamic bearing apparatus according to claim 17, wherein the plurality of diamond like carbon (DLC) pads form a herringbone groove pattern.

19. The hydrodynamic bearing apparatus according to claim 17, wherein the plurality of diamond like carbon (DLC) pads form a spiral groove pattern.

20. The hydrodynamic bearing apparatus according to claim 13, further comprising:

a second thrust plate at a second end of the stator member, the second thrust plate having a thrust surface, the second plate thrust surface facing a second end surface of the rotor member.

* * * * *